United States Patent
Jansen

[15] 3,654,986
[45] Apr. 11, 1972

| | | |
|---|---|---|
| [54] | AUTOMATIC MOLDING APPARATUS AND MOLD-MAKING MACHINE THEREIN | |
| [72] | Inventor: | Karl Jansen, Cleveland, Ohio |
| [73] | Assignee: | The Austin Company |
| [22] | Filed: | June 19, 1970 |
| [21] | Appl. No.: | 47,715 |
| [52] | U.S. Cl. | ...................164/173, 164/29, 164/137, 164/187, 164/227, 164/339 |
| [51] | Int. Cl. | ...................B22c 15/08 |
| [58] | Field of Search | ...................164/18, 27, 28, 29, 37, 38, 164/39, 40, 137, 172, 173, 180, 187, 188, 192, 193, 207, 212, 213, 227, 339, 340 |

[56] References Cited

UNITED STATES PATENTS

| | | | |
|---|---|---|---|
| 2,850,775 | 9/1958 | Northington et al. | 164/137 X |
| 3,300,823 | 1/1967 | Tuttle | 164/137 |
| 3,303,535 | 2/1967 | Rearwin et al. | 164/172 |
| 3,516,475 | 6/1970 | Dougherty | 164/37 |
| 3,556,196 | 1/1971 | Buhler | 164/187 X |

FOREIGN PATENTS OR APPLICATIONS

| | | | |
|---|---|---|---|
| 603,754 | 8/1960 | Canada | 164/40 |

*Primary Examiner*—J. Spencer Overholser
*Assistant Examiner*—John E. Roethel
*Attorney*—Woodling, Krost, Granger and Rust

[57] ABSTRACT

Automatic molding apparatus having a mold making machine with horizontally reciprocable operating parts for simultaneously making mold pieces with cope and drag cavities. The mold pieces are transferred onto one end of a conveyor or conveyors with each drag cavity facing upward to facilitate core setting. At the opposite end of the conveyor the mold pieces are stacked for pouring with the cope cavity in one facing downwardly and registering with the upwardly facing drag cavity in another.

16 Claims, 11 Drawing Figures

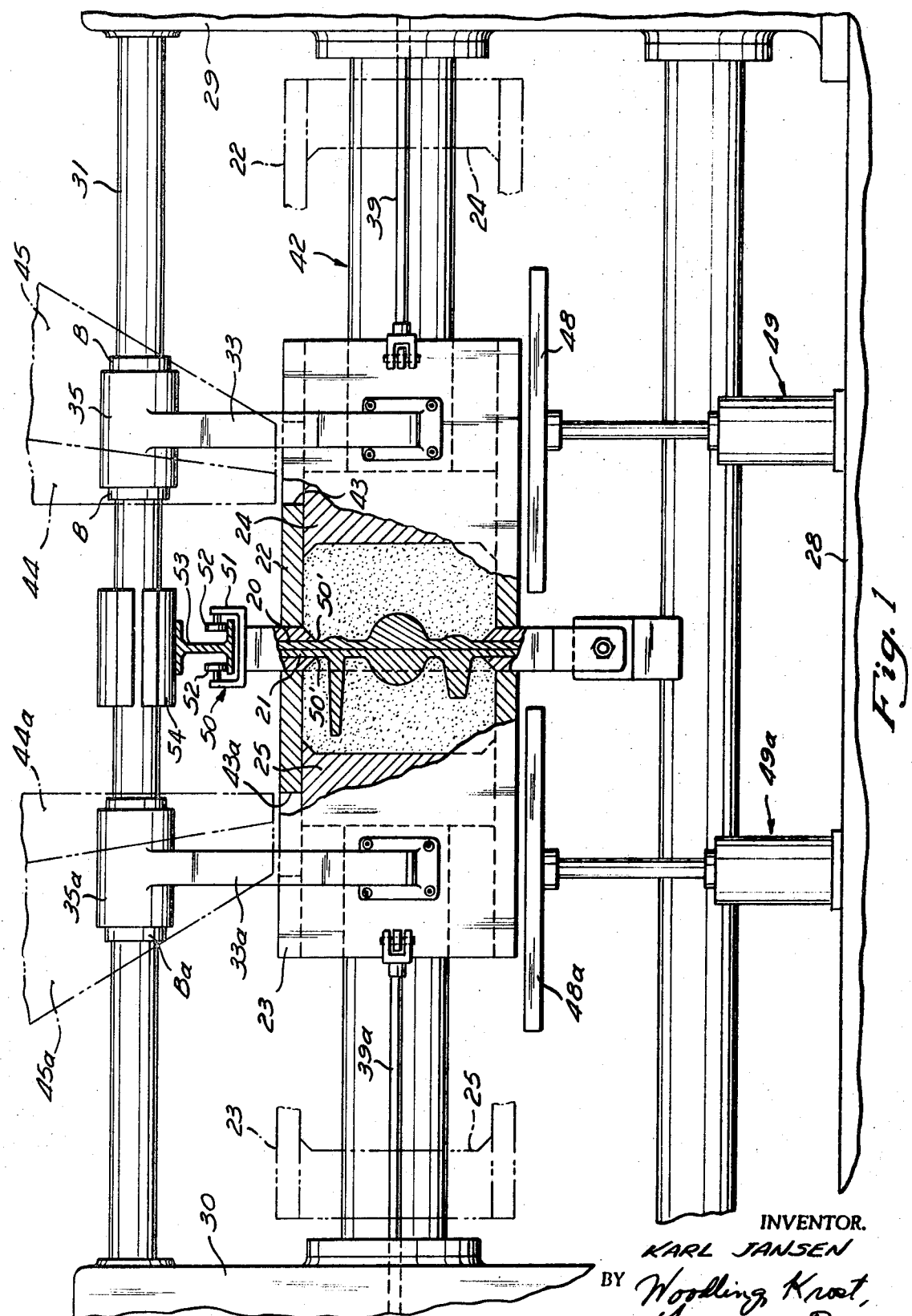

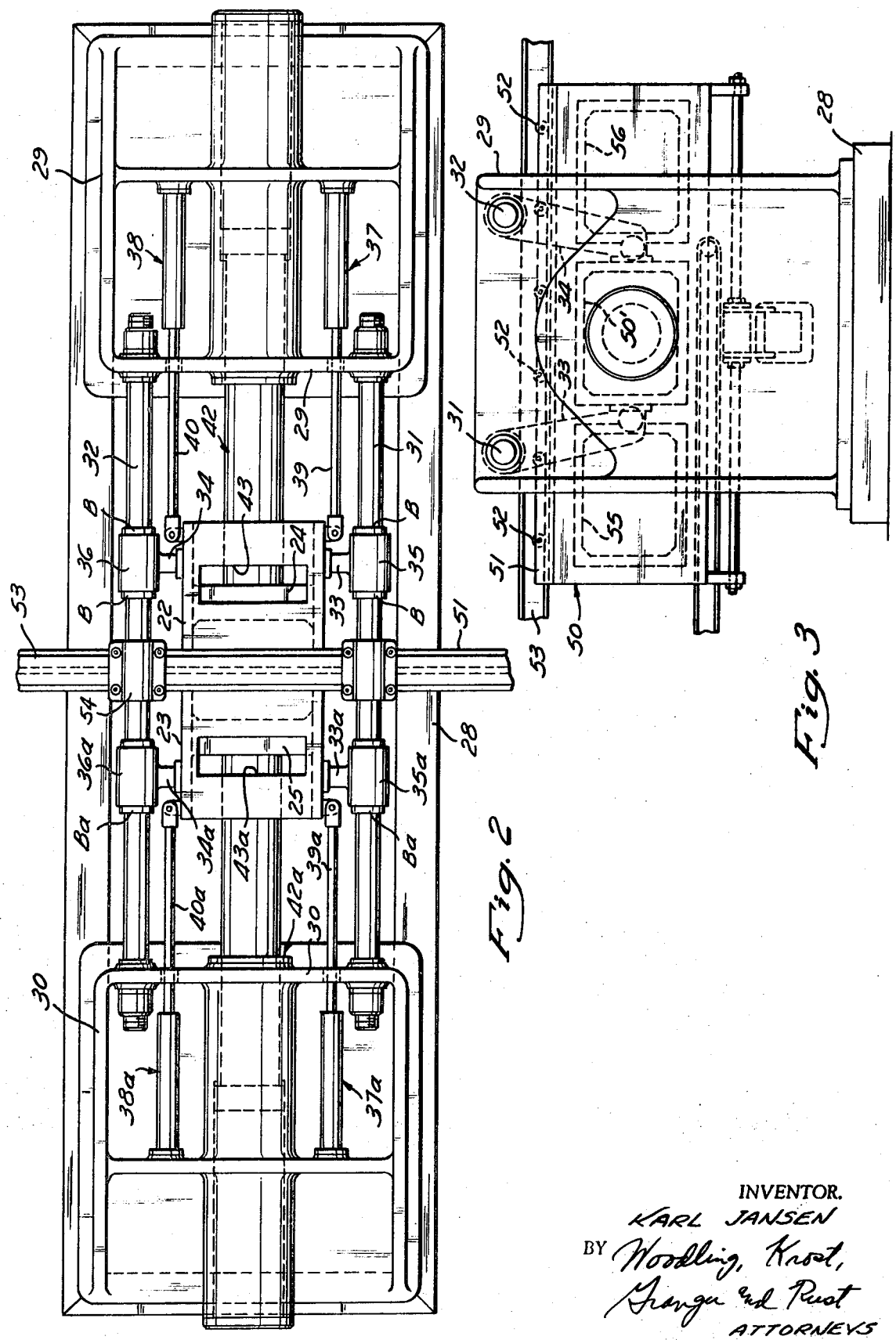

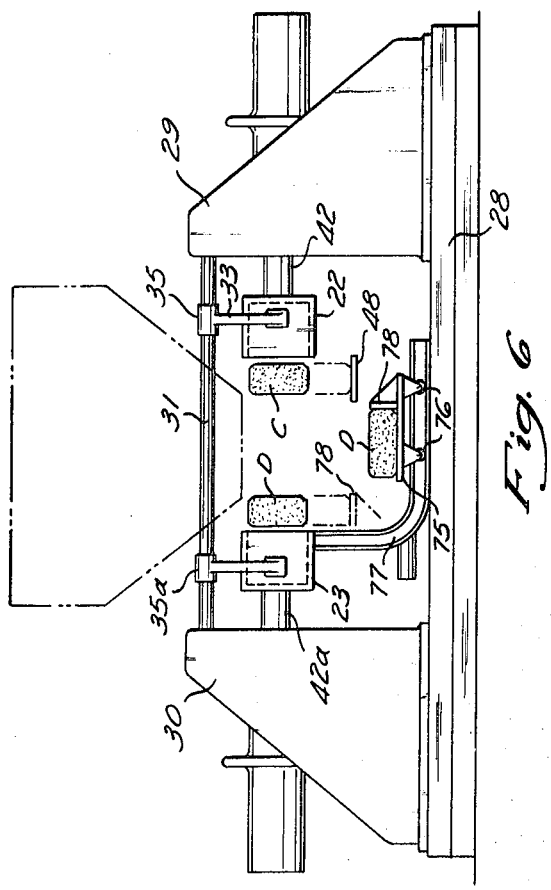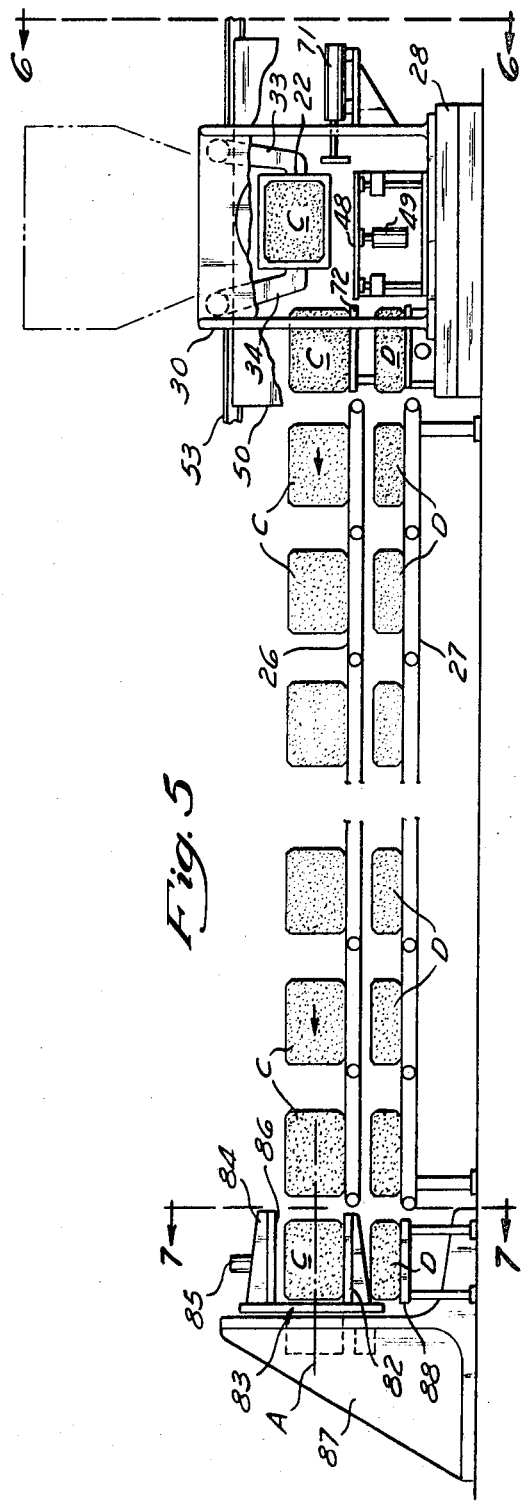

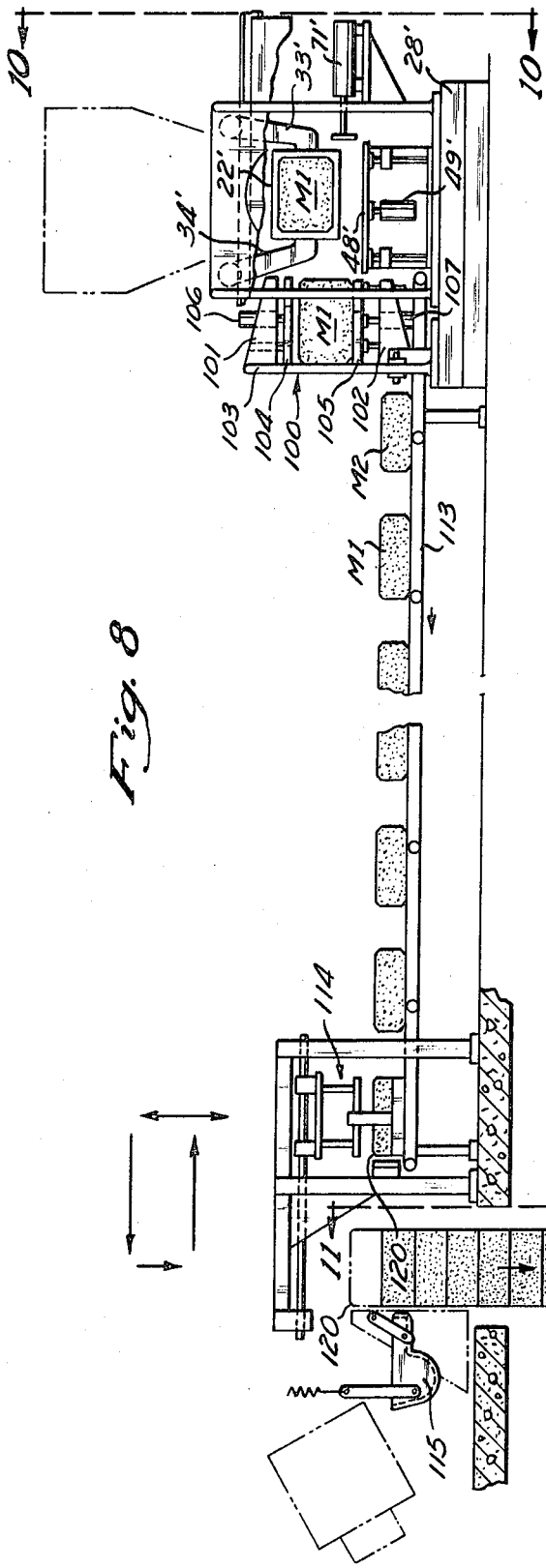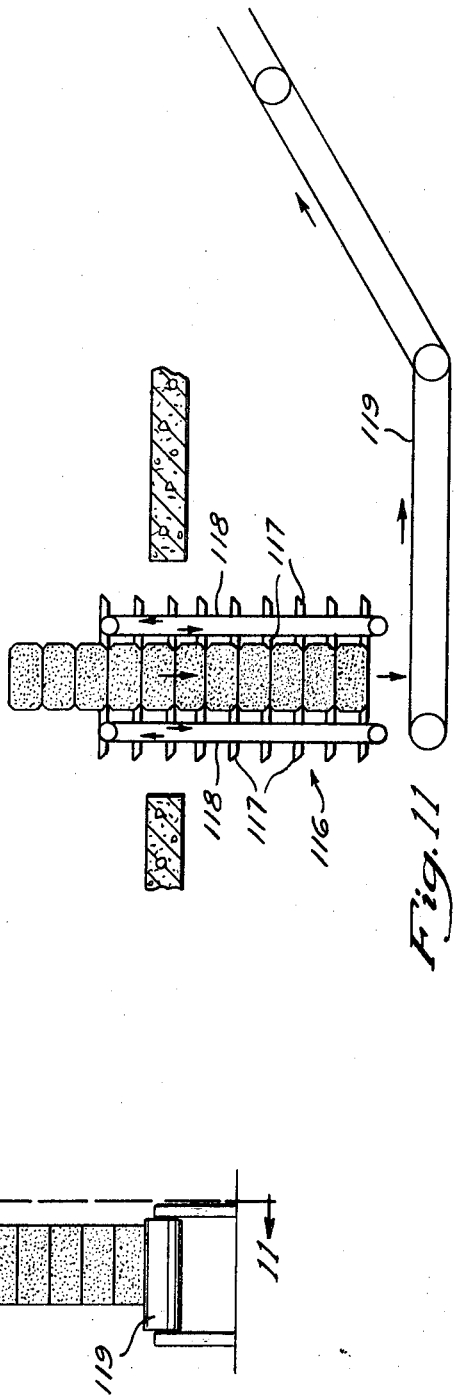

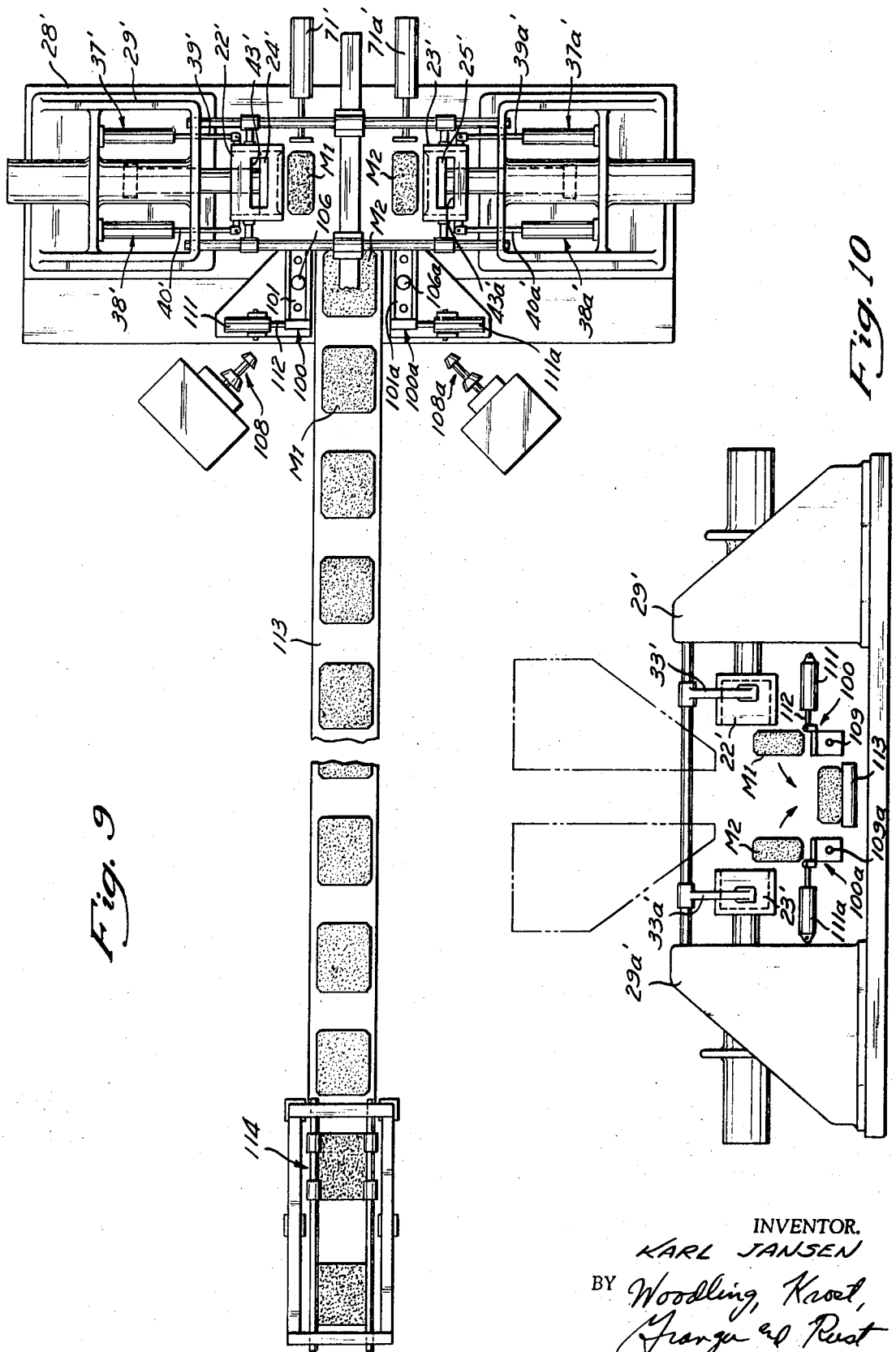

3,654,986

AUTOMATIC MOLDING APPARATUS AND MOLD-MAKING MACHINE THEREIN

SUMMARY OF THE INVENTION

The invention may be incorporated in an automatic mold making apparatus comprising, a mold making machine having a plate holder supporting a mold cavity-forming plate assembly substantially vertically, and respective mold flask and ram assemblies on opposite sides of said plate holder and each reciprocable horizontally toward and away from the latter to compact a mold in the flask and to eject the compacted mold from the flask in an upright position; conveyor means for carrying the molds to an assembly station; means for transferring the ejected molds onto said conveyor means including means for turning through 90° each upright mold which has a drag cavity therein so as to position the drag cavity facing upwardly to receive a core; and means at said assembly station for stacking molds with the cope cavity in one mold facing downwardly in registration with the upwardly facing drag cavity in another mold.

This invention relates to an automatic molding apparatus and to a mold making machine therein.

A principle object of this invention is to provide a novel and improved molding apparatus having a horizontally operating mold making machine, and a transfer mechanism which receives mold pieces made by the machine and turns them to position each drag cavity open at the top to facilitate core setting.

Another object of this invention is to provide such an apparatus in which the mold making machine forms simultaneously two mold pieces having matching cope and drag cavities and in which the transfer mechanism turns through 90° each mold piece which has a drag cavity before that mold piece is placed on a conveyor, and further comprising a mechanism at the opposite end of the conveyor for assembling the mold pieces with the cope cavity of one registering with the drag cavity of another.

Another principal object of this invention is to provide a novel and improved machine for forming two matching mold pieces simultaneously on opposite sides of a vertically supported pattern plate or match plate assembly and then ejecting these mold pieces.

Another object of this invention is to provide a novel and improved mold making machine in which the formation of the mold pieces and their ejection from the machine take place in horizontal machine strokes in a relatively high speed cycle of operation.

Another object of this invention is to provide a novel and improved mold making machine which minimizes the machine handling of the mold material before and during its compaction into a finished mold piece and as the finished mold piece is being ejected from the machine.

Another object of this invention is to provide a mold making machine having a novel and improved arrangement for controlling the filling of the mold flasks with sand prior to each compacting stroke.

Another object of this invention is to provide a novel and improved mold making machine in which the mold patterns may be changed selectively in a convenient and rapid manner.

Other objects and a fuller understanding of the invention may be had by referring to the following description and claims, taken in conjunction with the accompanying drawings.

BRIEF DESCRIPTION OF THE DRAWINGS

FIG. 1 is a front elevational view, with certain parts in section for clarity, of a machine for making cope and drag molds simultaneously in accordance with one important aspect of the present invention;

FIG. 2 is a top plan view of the FIG. 1 machine, with parts omitted for clarity;

FIG. 3 is an end elevational view taken from the right end of FIG. 1, with parts omitted;

FIG. 5 is a front elevational view of the FIG. 4 apparatus, with parts broken away for clarity;

FIG. 6 is a schematic elevational view taken on line 6—6 of FIG. 5, with parts omitted, and showing part of the mechanism for transferring each drag mold onto its conveyor;

FIG. 7 is a vertical section taken along the line 7—7 in FIG. 5 and showing the transfer mechanism which receives the cope mold from its conveyor;

FIG. 8 is a front elevational view, with parts broken away, showing a molding apparatus in accordance with a second embodiment of the present invention having at the right end a mold making machine basically similar to that of FIGS. 1–3, but different in some particulars, a mold assembly and pouring station at the left end, and a conveyor extending between them;

FIG. 9 is a top plan view of the FIG. 8 apparatus;

FIG. 10 is a schematic end elevation, taken on line 10—10 of FIG. 8, with parts omitted for clarity; and FIG. 11 is a schematic vertical elevational view of the indexing mechanism for lowering the stacked molds at the assembly station at the left end of FIGS. 8 and 9.

DESCRIPTION OF THE PREFERRED EMBODIMENT

Figure 4:
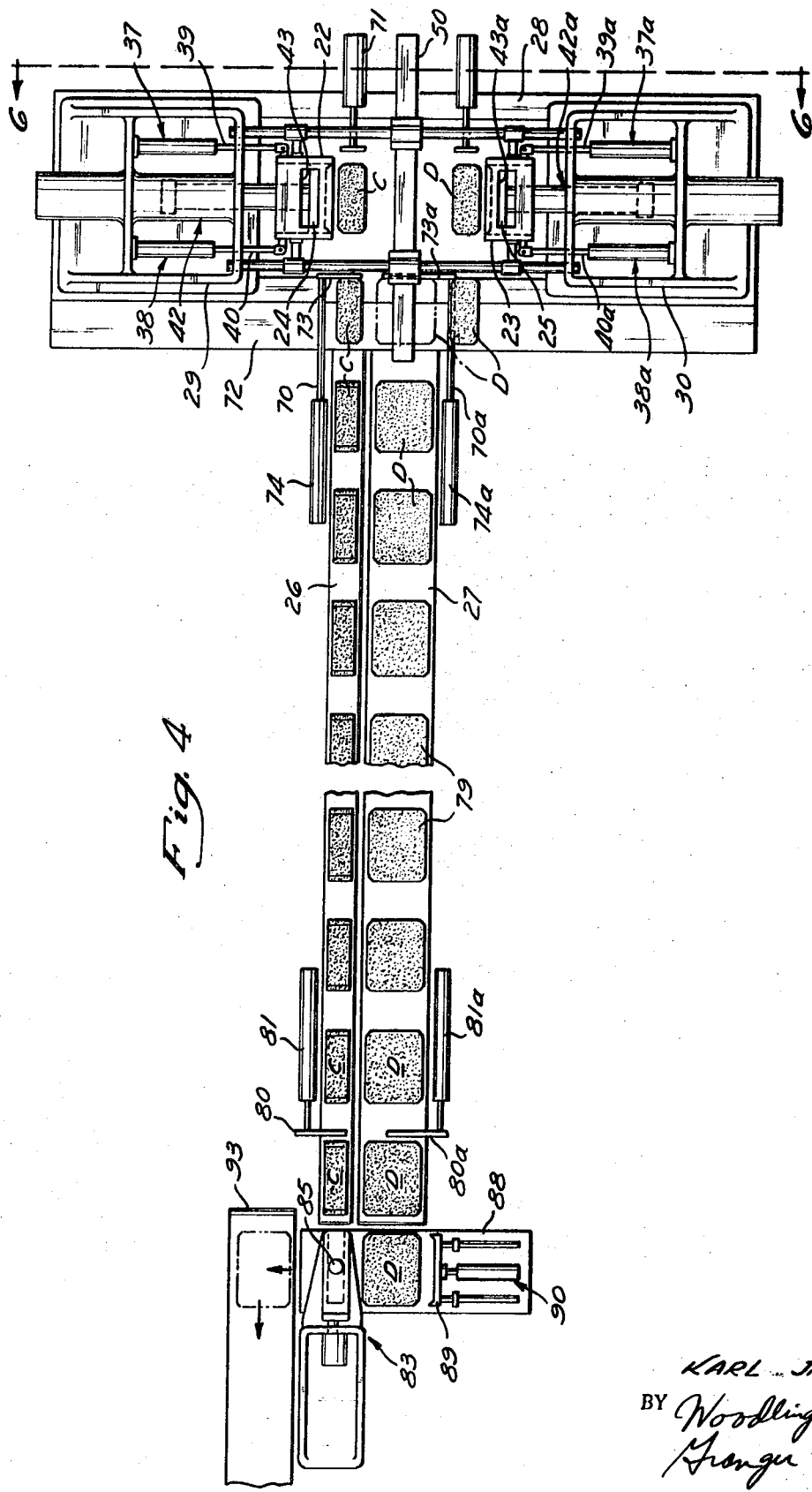
FIG. 4 is a top plan view, with parts broken away and other parts omitted for clarity, showing a molding apparatus in accordance with a first embodiment of the present invention having the mold making machine of FIGS. 1–3 at the right end, an assembly station at the left end, and conveyors extending between them.

In accordance with an important aspect of the present invention, a novel automatic mold-making machine is provided for producing molds that may be stacked one on top of the other to provide completed cope and drag mold pairs, as explained hereinafter.

Referring to FIG. 1, in the presently preferred embodiment, this machine comprises means for supporting pattern plates 20, 21 back-to-back or match plates and substantially vertical, a pair of mold flasks, such as a cope flask 22 and a drag flask 23, reciprocable horizontally on opposite sides of the pattern plates or match plates, and squeeze rams 24 and 25 co-operable with these flasks to form the respective molds and to eject the completed molds from the flasks for transfer onto respective conveyors 26 and 27 (FIGS. 4 and 5).

The machine framework has a rigid base 28 and a pair of rigid upright standards 29 and 30 at opposite ends of the base. A pair of guide rods 31 and 32 (FIG. 2) extend horizontally between the two standards 29 and 30 near the top. The cope flask 22 is slidably suspended from these guide rods by a pair of support arms 33 and 34, which at their lower ends are rigidly attached to the cope flask and at their upper ends terminate in sleeves 35 and 36 which are slidable along the respective guide rods 31 and 32. Each sleeve has an anti-friction bushing B at each end which slidably engages the respective guide rod.

The cope flask 22 is reciprocable horizontally toward and away from the pattern plate 20 by a pair of hydraulically operated cylinder-and-piston units 37 and 38 (FIG. 2). The cylinder of each of these units is rigidly mounted on the standard 29. The outer ends of the respective piston rods 39 and 40 of these units are pivotally connected to the rear of the cope flask 22 on opposite sides thereof. FIGS. 1 and 2 show the piston rods extended, holding the open front end of the cope flask against the pattern plate 20. When the pistons in units 37 and 38 are retracted, the piston rods pull the cope flask back away from the pattern plate 20.

The cope flask 22 is hollow along its entire horizontal length and it snugly, but slidably, receives the squeeze ram 24. The ram is reciprocable horizontally by a hydraulic cylinder-and-piston unit 42, the cylinder of which is an integral part of the standard 29.

The cope flask 22 has a rectangular top opening 43 which in the forward position of the cope flask (FIG. 1) is disposed just below a pair of hoppers 44 and 45 which have rotary vane-type distributors at their lower ends. The front hopper 44 receives smooth, fine, facing sand. The rear hopper 45 receives damp, coarse, backing sand.

The ram 24 coacts with this opening 43 in the cope flask to provide a valving action controlling the entry of sand into the cope flask 22. When the ram is retracted rearwardly from the position shown in FIG. 1, it uncovers the opening 43 so that sand can be discharged from the hoppers 44, 45 down into the cope flask 22 in front of the ram. Then, when the ram 24 is moved forward within the cope flask it forces the sand against the pattern plate 20 and also closes off the sand inlet opening 43 in the top of the cope flask.

A receiver table 48 is disposed below the path of travel of the cope flask 22, substantially vertically beneath the lower ends of the sand hoppers 44 and 45. The finished cope mold is received by this table when ejected from the cope flask, as described hereinafter. This table is supported by a hydraulic cylinder-and-piston unit 49 which enables the table height to be adjusted.

As described hereinafter, a pushout mechanism is provided at the table 48 to push the cope mold piece horizontally off the table 48 and onto a conveyor.

At the opposite side of the pattern plates 20, 21 the horizontally reciprocable drag flask 23 cooperates with its squeeze ram 25 in substantially the same fashion as do the cope flask 22 and its squeeze ram 24. The assembly at this side is substantially a mirror image of the assembly at the right side of the pattern plates, with corresponding elements having the same reference numerals with an "a" suffix added, and therefore a detailed description of these elements is unnecessary.

The pattern plates 20, 21 in FIG. 1 are clamped back-to-back between the opposite sides of a plate carrier or holder 50, which presents at each side a generally rectangular opening 50' where the respective pattern plate is exposed. The holder 50 is suspended from a generally U-shaped support 51 carrying opposed pairs of rollers 52 at intervals along its length. These rollers ride on upwardly facing track surfaces provided by the bottom flange of a horizontally extending I beam 53. This I beam is rigidly attached to clamps 54 which are rigidly attached to the guide rods 31 and 32. With this arrangement, the I beam 53 provides a fixed, lateral, overhead track along which the carrier 50 for the pattern plates is slidably adjustable horizontally in a plane perpendicular to the direction of horizontal reciprocation of the cope and drag flasks 22, 23 and the respective squeeze rams 24 and 25. This permits the carrier 50 to be moved to one side for changing of the pattern plates 20 and 21.

As best seen in FIG. 3, the pattern plate holder 50 supports two additional sets of pattern plates, so that by sliding the holder 50 laterally along the I-beam 53, any one of the three sets of pattern plates may be positioned between the cope and drag flasks. For this purpose, the holder presents additional generally rectangular openings 55 and 56 at which these pattern plates are exposed. Thus, by a simple lateral adjustment of the pattern plate holder the patterns for the cope and drag molds may be changed. Such adjustment may be made during the interval between successive strokes of the machine, when the cope and drag flasks are retracted away from the pattern plates.

Alternatively, the pattern plate holder may be rotatably mounted so that by turning it to the desired rotational position, any selected set of pattern plates may be positioned between the cope and drag flasks.

In operation of the apparatus thus far described, the pattern plate holder 50 is positioned laterally so as to locate the selected set of pattern plates between the cope and drag flasks. The the respective cylinder-and-piston units 37, 38 and 37a 38a for the cope and drag flasks 22 and 23 are actuated to position these flasks forward against the pattern plates, as shown in FIG. 1. The rams 24 and 24a are retracted relative to the flasks, uncovering the sand inlet openings 43 and 43a in the tops of the flasks so that the flasks may receive sand from the respective sets of hoppers 44, 45 and 44a, 45a. Then, the ram piston-and-cylinder units 42 and 42a are actuated so that the rams 24 and 25 move forwardly simultaneously in the cope and drag flasks to compact the sand between the respective pattern plate and the ram and between the side walls of the respective flask.

After the compaction of the sand in the flasks has been completed, each flask 22 or 23 and the respective ram 24 or 25 are simultaneously retracted a full stroke horizontally away from the pattern plates thereby withdrawing the compacted mold piece. After each ram and flask have been retracted for the full stroke, then a second forward stroke of the rams 24 and 25 extrudes each mold out of its flask, while the flask remains stationary, onto the respective table 48 or 48a, which preferably is level with the bottom edge of the mold to prevent damage to the mold. From the respective table, the mold is transferred onto a conveyor.

After the two ejected molds have been transferred beyond the path of travel of the cope and drag flasks 22 and 23, as described hereinafter, the cope and drag flasks are now moved forwardly into engagement with the respective pattern plates. In doing so, the fill openings 43 and 43a in these flasks move forwardly beyond the respective rams 24 and 25 and into registration with the lower ends of the sand hoppers 44 and 45 so that a new charge of facing sand and backing sand may be deposited in each flask. Following this, the rams again are moved forwardly to compact the sand as described.

The horizontal reciprocation of the cope and drag flasks and the respective rams facilitates the quick filling of each flask with sand with a minimum of spillage just prior to compaction and it also facilitates the withdrawal of the completed molds away from the pattern plates and the ejection of the molds from the flasks for transfer to a conveyor all in a rapid sequence. An uninterrupted high speed cycle of operation is achieved with a minimum of physical movement of the mold material both before and after compaction. The term "sand" is used hereinafter and in the claims to denote such mold material.

If desired, the pattern plates may be replaced by match plates and also the front faces of the respective rams 24 and 25 may have the contour desired for providing cope or drag cavities in the adjacent end faces of the compacted molds.

In accordance with another aspect of this invention, each finished mold which has a drag cavity is turned 90° to have its drag cavity face upwardly while being conveyed through the core setting area 79, while each mold that does not have a drag cavity remains in the upright position it has when ejected from the flask.

In the embodiment illustrated in FIGS. 4–7 and now to be described, separate conveyors are provided for the drag and cope molds, respectively. Each cope mold is conveyed in an upright position parallel to the path of the corresponding drag mold and at a higher elevation so that at the discharge end of the conveyor it can be turned over 90° to a position overlying, and registering with, the corresponding drag mold to close the mold pair assembly.

Referring to FIG. 5, when the cope mold C is to be ejected from the cope flask 22, as described, the receiving table 48 is raised by its cylinder-and-piston unit 49 to receive the cope mold and then this table is lowered to the same level as the cope conveyor 26. The cope mold is pushed horizontally off this table, from right to left in FIGS. 4 and 5, by a hydraulically operated pushout cylinder and piston unit 71. At the end of the stroke of the push-out piston the upright cope mold rests on a horizontal shelf 72 at the left side of the mold making machine. From this shelf the cope mold is transferred horizontally from right to left onto the cope conveyor 26 by a generally L-shaped transfer arm 73 (FIG. 4). This arm 73 pivots on a piston rod 70 to move behind the cope mold C and then is horizontally operated by a cylinder-and-piston unit 74. Throughout this operation the cope mold remains in the same upright position it occupied when in the cope flask, with its cavity facing forwardly in FIG. 5 (downwardly as viewed in FIG. 4) toward the conveyor 27 for the drag molds.

When the drag mold D is to be ejected from the drag flask 28, its receiving table 48a is raised by the respective cylinder-and-piston unit 49a to receive the drag mold. Then this table is lowered to a level enabling the push-out cylinder-and-piston unit 71a to push the drag mold off the table horizontally from right-to-left in FIGS. 4 and 5.

A transfer car 75 (FIG. 6) receives the drag mold piece as it is pushed off the table 48a. This transfer car has rollers or wheels 76 that ride along a pair of fixed tracks 77 which are located just to the left of the mold making machine in FIGS. 4 and 5. These tracks extend down vertically from a position just below the level of the elevated table 48a when the drag mold D is being pushed off, then make a 90° arcuate bend and present horizontal segments disposed below the pattern plates 20, 21. The transfer car 75 is in the phantom line position of FIG. 6 when the drag mold is being pushed off its receiving table 48a, and at this time the transfer car presents an upwardly facing shelf 78 for engagement by the bottom edge of the then-upright drag mold D. Then the transfer car rides down the tracks 77 to the horizontal position shown in full lines in FIG. 6. In doing so it turns the drag mold 90°, so that the drag cavity in the drag mold now faces upwardly. Any suitable mechanism (not shown) may be provided for moving the transfer car 75 back and forth along the tracks 77 in properly timed relationship with other operating parts of the machine.

Next, a generally L-shaped transfer arm 73a (FIG. 4), pivots on a piston rod 70a to lie behind the drag mold D and the drag mold D is transferred horizontally from the car 75 onto its conveyor 27 by means of a cylinder-and-piston unit 74a. Such transfer of the drag mold takes place from right to left in FIGS. 4 and 5.

The conveyor 26 for the cope molds C and the conveyor 27 for the drag molds D may be of any suitable design, the details of which are not important to an understanding of the present invention. It will be evident from FIG. 5 that the drag mold conveyor 27 is at a lower horizontal level than the cope mold conveyor 26.

The drag mold transfer arm 73a is operated in synchronism with the cope mold transfer arm 73, so that on the conveyors each drag mold D is aligned with a cope mold C, as shown in FIGS. 4 and 5.

As the drag molds D are moved from right to left in FIGS. 4 and 5, cores may be inserted in their respective upwardly facing drag cavities in the core setting area 79.

When each cope mold C reaches the left end of its conveyor 26 in FIGS. 4 and 5, it is engaged by a push-off arm 80 actuated by a cylinder-and-piston unit 81. As best seen in FIG. 5, the upright cope mold is pushed horizontally off the conveyor 26 onto the lower arm 82 of a rotatable transfer unit 83. This transfer unit is supported by an upright standard 87 for rotation about a horizontal axis A in FIGS. 4 and 5, which extends parallel to the centerline of the cope mold conveyor 26 and above the latter. The transfer unit 83 has an upper arm 84 carrying a cylinder-and-piston unit 85 for operating a clamp plate 86 which faces toward the lower arm 82 of the transfer unit. After the cope mold C is transferred onto the lower arm 82 of the transfer unit 83, the cylinder-and-piston unit 85 is pressurized to force the clamp plate 86 down against the top edge of the cope mold, so that now the cope mold is securely gripped in the transfer unit.

Then the transfer unit 83 is rotated 90° (counterclockwise in FIG. 7) to position the cope mold with its cope cavity facing downwardly. Any suitable motor-operated mechanism (not shown) may be provided for turning the transfer unit in this manner.

When each drag mold D reaches the left end of its conveyor 27 (at the same time as the corresponding cope mold C reaches the end of its conveyor) it is engaged by a push-off arm 80a (FIG. 4) actuated by a cylinder-and-piston unit 81a. The drag mold is pushed horizontally off the conveyor 27 onto a transfer table 88. Then, a push-off plate 89 (FIGS. 4 and 7), operated by a cylinder-and-piston unit 90, pushes the drag mold horizontally to the right in FIG. 7 onto an elevator 91 disposed below the rotary transfer unit 83 for the cope molds.

As shown in FIG. 7, at this time the elevator 91 is at the same horizontal level as the transfer table 88. The drag mold transferred onto the elevator has its drag mold cavity facing upwardly.

With the cope mold C held now by its transfer unit 83 with its cope cavity facing downwardly, as shown in phantom in FIG. 7, the elevator 91 after receiving the drag mold D is raised by a cylinder-and-piston unit 92 to position the drag mold directly beneath the cope mold held by the transfer unit 83. Next, the clamp plate 86 on the cope mold transfer unit 83 is retracted by its cylinder-and-piston unit 85, releasing the cope mold so that now it rests on top of and in proper registration with the drag mold on the elevator 91.

The cylinder-and-piston unit 92 now lowers the elevator 91 to the level of the transfer table 88. The push-off plate 89 now is actuated by its cylinder-and-piston unit 90 to push the drag mold D and the overlying cope mold C horizontally back onto a mold conveyor 93 (FIGS. 4 and 7) which carries the closed mold pair horizontally over to a pouring zone (not shown).

Following this, the cope mold transfer unit 83 is rotated 270° clockwise in FIG. 7 so that now it is positioned again to receive the next upright cope mold C from the conveyor 26. Also, the push-off plate 89 is retracted by its cylinder-and-piston unit to the position shown in FIG. 4.

With the foregoing arrangement, the drag molds are positioned on the drag conveyor 27 with their cavities facing upwardly, which facilitates the insertion of cores, preferably mannually. The insertion of the cores into the drag cavities is performed outside of, and independent of the cycle time of, the machine in which the cope and drag molds are formed, so that the operation of the machine is unaffected by the time required for core setting. Then at the assembly station at the discharge end of the conveyor, the cope molds are properly stacked on the drag molds to provide complete mold pairs. The positioning of the drag molds for receiving cores while on the drag conveyor and the subsequent stacking of the cope molds on the drag molds is carried out with a minimum of handling of the respective molds.

FIGS. 8–11 show an alternative apparatus in accordance with the present invention for use in stack molding.

The mold making machine at the right end of each of FIGS. 8 and 9 is identical to that of FIGS. 1–3 except that the rams 24' and 25' are shaped to form drag cavities in the adjacent end faces of the molds and the pattern plates 20' and 21' disposed vertically between the flasks 22' and 23' are shaped to provide cope cavities on the opposite end faces of these molds. Accordingly, each of the two compacted molds formed simultaneously by this machine will have the drag cavity at the outside end face and the cope cavity at the inside end face. Except for this, the mold making machine is the same as already described in detail with reference to FIGS. 1–3, and corresponding elements of this machine in FIGS. 8 and 9 are given the same reference numerals as in FIGS. 1–3, with a "-prime" suffix added.

After the mold M1 is ejected from the flask 22', it rests upright on the receiving table 48' with its cope cavity facing inwardly toward the mold M2 ejected from the other flask 23'. Similarly, the second mold M2 rests upright on its receiving table 48a', with its cope cavity facing inwardly toward the first mold M1.

The mold push-out cylinder-and-piston units 71' and 71a' are actuated alternately so that first the upright mold M1 remains upright and is pushed horizontally from right to left, FIG. 9, off its receiving table 48' and then the second mold M2, while remaining upright, is pushed horizontally from right to left off its table 48a'.

The first mold M1 is received by a mold setter 100 (FIG. 8) having upper and lower horizontal arms 101, 102 and an upright standard 103 joining them. Upper and lower clamping plates 104 and 105 are operated by respective cylinder-and-piston units 106 and 107, carried respectively by the upper and lower arms of the mold setter, to grip the mold M1 between them or to release the mold.

When the mold M1 is being pushed horizontally off its receiving table, the lower clamping plate 105 on the mold setter is at the same level as the table, so that the bottom edge of the mold slides freely onto this clamping plate. At the same time, the upper clamping plate 104 is retracted upwardly so as not to obstruct the transfer of the mold onto the mold setter. Then the upper and lower clamping plates of the mold setter are forced toward each other until they securely grip the mold M1, between them, still in an upright position.

Following this a pouring sprue hold is drilled in the mold M1 by means of a sprue drill 108, which preferably operates automatically in timed relationship with the mold making machine. This sprue hole extends obliquely into a riser leading to the bottom of the drag cavity in this mold M1 from the beveled corner 120 between the outside end face and the left edge of the mold in FIG. 8.

The upright standard 103 of the mold setter 100 is pivotally mounted near its lower end on a horizontal pivot rod 109 (FIG. 10). A cylinder-and-piston unit 111, which is supported by the framework of the mold making machine, has the outer end of its piston rod 112 pivotally connected to the upright standard 103 of the mold setter 100 above the latter's pivot rod 109.

The mold setter 100 is rotated 90° downwardly about its pivot rod 109 when the cylinder-and-piston unit 111 is actuated to move its piston rod 112 outwardly. Such pivotal movement of the mold setter causes the formerly upright mold M1 to be turned 90° to a position in which its cope cavity faces downwardly and its drag cavity faces upwardly. At this time the cylinder and piston units 106, 107 for the clamp plates 104,105 in the mold setter 100 are actuated to move these clamp plates apart, thereby permitting the mold M1 to rest on a conveyor 113 which runs horizontally from right to left in FIGS. 8 and 9.

Following this, the cylinder-and-piston 111 for pivoting the mold setter 100 retracts it to its normal upright position.

At the completion of this transfer of the first mold M1 from its receiving table 48 over to the conveyor 113, the second mold M2 is transferred and drilled to provide a pouring sprue in the same manner by a similar mechanism, corresponding parts of which have the same reference numerals, with an "a" suffix added, as those of the transfer mechanism for the first mold M1.

Thus, the two molds M1 and M2 which are made in each cycle of the mold making machine are transferred, one after the other, over onto the conveyor 113, and during the transfer a sprue hole is drilled in each mold. Each mold is positioned on the conveyor 113 with its drag cavity facing upwardly, so that a core may be set in this cavity as the mold travels horizontally from right to left in FIGS. 8 and 9.

When each mold M1 or M2 reaches the assembly station at the left end of the conveyor 113 in FIGS. 8 and 9, it is automatically transferred onto a vertical stack of the molds which preceded it on the conveyor. The transfer mechanism 114 for this purpose is illustrated only in fragmentary fashion in FIG. 8 since its details are not essential to the present invention and a variety of different transfer mechanisms could be used to perform this function. This transfer mechanism 114 grips each mold, lifts it and moves it laterally onto the stack.

When transferred from the conveyor onto the stack, each mold is maintained in the same orientation, with its drag cavity facing upwardly and its cope cavity facing downwardly, and its sprue hold open at its upper left corner 120. Consequently, the cope cavity of one mold will register with the drag cavity in the next lower mold in the stack, and these two registering cavities together provide the mold cavity into which the molten metal may be poured through the sprue holes in the molds.

Preferably, the pouring of the molten metal into the mold cavity is performed automatically by means of a pivoted pouring ladle 115 which is tilted to a pouring position in which its spout registers with the sprue hole in one pair of molds M1 and M2. After the mold cavity is filled, the pouring ladle is retracted to a non-pouring position. The mechanism for effecting such movements of the pouring ladle is not shown in detail, but it will be apparent that its operation should be properly timed with respect to the transfer of the molds onto the stack.

The vertical stack of molds is supported by a caterpillar-type indexing unit 116 (FIG. 11) of known design, which lowers the stack intermittently in properly timed relationship with the filling of the mold cavities. This indexing unit has a series of vertically spaced sets of plates 117 attached to respective endless belts or tracks 118, which are advanced intermittently in the direction indicated indicated by the arrows in FIG. 11. Each plate 117 in the indexing unit has an upwardly facing beveled inside edge for engagement with the beveled bottom edge on each mold M1 or M2.

The solidified castings in the mold cavities are removed at the lower end of the indexing unit 116 and deposited on a return conveyor 119.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. An automatic mold making apparatus comprising,
    a mold making machine having a plate holder supporting a mold cavity-forming plate assembly substantially vertically, and respective mold flask and ram assemblies on opposite sides of said plate holder and each reciprocable horizontally toward and away from the latter to compact a mold in the flask and to eject the compacted mold from the flask in an upright position,
    conveyor means for carrying the molds to an assembly station,
    means for transferring the ejected molds onto said conveyor means including means for turning through 90° each upright mold which has a drag cavity therein so as to position the drag cavity facing upwardly to receive a core,
    and means at said assembly station for stacking molds with the cope cavity in one mold facing downwardly in registration with the upwardly facing drag cavity in another mold.

2. An apparatus according to claim 1, wherein said plate assembly coacts with one of said flask and ram assemblies to form a cope mold and coacts with the other of said flask and ram assemblies to form a drag mold,
    said conveyor means comprises a drag conveyor and a cope conveyor,
    and said means for transferring the molds onto said conveyor means comprises means for transferring the ejected cope mold onto the cope conveyor in an upright position with its cavity facing toward the drag conveyor, and means for turning the ejected drag mold 90° and positioning it on the drag conveyor with its cavity facing upwardly.

3. An apparatus according to claim 2, wherein said means at the assembly station for stacking molds comprises,
    means for transferring each drag mold from the drag conveyor with its cavity facing upwardly,
    means for transferring each cope mold from the cope conveyor in an upright position and then turning the cope mold 90° to a position overlying the corresponding drag mold with its cavity facing downwardly and registering with the upwardly facing cavity in the drag mold.

4. An apparatus according to claim 1, wherein said plate assembly coacts with both flask and ram assemblies to form cope and drag cavities in opposite faces of both molds,
    and the ejected molds of each pair are transferred one after the other onto said conveyor means with the cavity of each facing upwardly.

5. An apparatus according to claim 4, wherein said means for transferring the molds onto said conveyor means comprises, a pair of mold setters for receiving the respective molds in an upright position after their ejection and for turning each upright mold 90° to position its cavity facing upwardly and then releasing the mold.

6. Apparatus according to claim 5, wherein said means at the assembly station for stacking molds transfers the successive molds from said conveyor means with the cope cavity of each cope mold facing downwardly and the drag cavity of each drag mold facing upwardly and stacks them in succession one on top of the other.

7. An automatic mold making apparatus comprising, a plate holder for supporting a mold cavity-forming plate assembly substantially vertically, a first mold flask and a squeeze ram cooperable therewith mounted at one side of said plate assembly and reciprocable substantially horizontally toward and away from the latter;

a second mold flask and a squeeze ram cooperable therewith mounted at the opposite side of said plate assembly and reciprocable substantially horizontally toward and away from the latter, means for holding said flasks against the opposite sides of said plate assembly, means for advancing the squeeze rams substantially simultaneously toward said plate assembly to compact sand in the respective flasks, means for retracting the flasks and squeeze rams away from said plate assembly and for ejecting the compacted molds from the respective flasks, means for filling the flasks with sand after the ejection of the compacted molds therefrom, conveyor means for conveying the compacted molds to an assembly station after their ejection from the flasks, and means at the assembly station for stacking one mold on top of another with a cope mold cavity in one mold facing toward a drag mold cavity in the other.

8. Apparatus according to claim 7, wherein said plate assembly coacts with one of said flasks and the respective ram to form a cope mold and coacts with the other of said flasks and the respective ram to form a drag mold, and said conveyor means comprises a substantially horizontal drag conveyor and a substantially horizontal cope conveyor at a higher level than the drag conveyor, and further comprising, means for transferring the ejected cope mold onto the cope conveyor in an upright position with its cavity facing toward the drag conveyor, means for turning the ejected drag mold 90° and then transferring the drag mold onto the drag conveyor with its cavity facing upwardly to receive a core while on said drag conveyor, and stacking means at the assembly station for turning the cope mold 90° to position its cavity facing downwardly and overlying the corresponding drag mold before being stacked thereon.

9. Apparatus according to claim 8, wherein said means for transferring the ejected cope mold onto the cope conveyor comprises, a table disposed below the flask in which the cope mold is formed, means for raising said table to receive the cope mold as it is ejected from the respective flask and for lowering the cope mold to the level of the cope conveyor, and means for sliding the cope mold horizontally from said table onto the cope conveyor.

10. Apparatus according to claim 8, wherein said means for turning and transferring the ejected drag comprises, rail means having an upwardly extending vertical segment, a lower horizontal segment and a 90° arcuate bend joining said vertical segment to said horizontal segment, a transfer car movable along said rail means between a raised vertical position for receiving the drag mold as it is ejected from the respective flask and a lowered horizontal position holding the drag mold with its cavity facing upwardly, and means for moving the drag mold horizontally from said last-mentioned position on the transfer car over onto the drag conveyor.

11. Apparatus according to claim 8 wherein said stacking means at the assembly station comprises, a rotatable transfer unit having releasable clamp means thereon, means for sliding the cope mold in said upright position from the cope conveyor onto said transfer unit, and means for actuating said clamp means to hold the cope mold on said transfer unit while the latter is being turned 90° to position the cope mold with its cavity facing downwardly and for releasing said clamp means to release the cope mold from said transfer unit after being turned 90°.

12. Apparatus according to claim 7 wherein both molds ejected from the respective flasks have a cope cavity in one face thereof and a drag cavity in the opposite face, and means transferring the molds ejected from the respective flasks one after the other onto said conveyor means with the drag cavity of each facing upwardly.

13. Apparatus according to claim 12 and further comprising, a pair of mold setters for receiving and holding the respective mold in an upright position after ejection from the respective flasks, means for turning each mold setter 90° to position the respective mold with its drag cavity facing upwardly and then releasing the mold from the mold setter, and means for sliding the released mold substantially horizontally over onto said conveyor means.

14. Apparatus according to claim 13 and further comprising means for forming sprue holes in the molds while held in an upright position in the respective mold setter.

15. Apparatus according to claim 12, wherein said stacking means at the assembly station transfers the successive molds from said conveyor means with the cope cavity of each facing downwardly and the drag cavity facing upwardly and stacks them in succession one on top of the other with the cope cavity in one mold registering with the drag cavity in the next lower mold in the stack.

16. Apparatus according to claim 12 and further comprising, means for forming sprue holes in the molds as they are transferred onto said conveyor means, and means for pouring molten metal into said sprue holes in the stacked molds at said assembly station.

* * * * *